United States Patent
Shin et al.

(10) Patent No.: US 8,508,505 B2
(45) Date of Patent: Aug. 13, 2013

(54) VIRTUAL OPTICAL INPUT DEVICE FOR PROVIDING VARIOUS TYPES OF INTERFACES AND METHOD OF CONTROLLING THE SAME

(75) Inventors: Yun Sup Shin, Seoul (KR); Yung Woo Jung, Seoul (KR); Young Hwan Joo, Seoul (KR); In Ho Choi, Seoul (KR); Mun Chae Joung, Seoul (KR); Jeong Uk Lee, Seoul (KR); Mi Hyun Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 1057 days.

(21) Appl. No.: 12/366,502

(22) Filed: Feb. 5, 2009

(65) Prior Publication Data

US 2009/0235195 A1    Sep. 17, 2009

(30) Foreign Application Priority Data

Feb. 5, 2008   (KR) .................. 10-2008-0011495
Feb. 15, 2008  (KR) .................. 10-2008-0013819
Jul. 31, 2008  (KR) .................. 10-2008-0075288
Aug. 1, 2008   (KR) .................. 10-2008-0075385

(51) Int. Cl.
| G06F 3/042 | (2006.01) |
| G06F 3/041 | (2006.01) |
| G06F 3/048 | (2013.01) |
| G09G 5/00  | (2006.01) |
| H03K 17/94 | (2006.01) |
| G02B 5/32  | (2006.01) |
| G03H 1/26  | (2006.01) |

(52) U.S. Cl.
USPC ........... 345/175; 345/168; 345/169; 345/173; 341/22; 359/15; 359/22; 715/773

(58) Field of Classification Search
USPC ................ 345/156–178, 7–9; 715/700, 764, 715/771, 773; 353/28–30, 62, 103, 114; 349/5–11, 13, 18; 341/22–23; 359/15, 20–22
See application file for complete search history.

(56) References Cited

U.S. PATENT DOCUMENTS

| 5,963,276 | A  | * | 10/1999 | Inbar ................................. 349/5 |
| 6,211,944 | B1 | * | 4/2001  | Shiraishi ......................... 355/53 |
| 6,611,252 | B1 | * | 8/2003  | DuFaux .......................... 345/168 |
| 6,750,849 | B2 |   | 6/2004  | Potkonen |
| 2002/0075239 | A1 |   | 6/2002 | Potkonen |
| 2002/0171633 | A1 | * | 11/2002 | Brinjes .......................... 345/168 |
| 2003/0021032 | A1 | * | 1/2003 | Bamji et al. ................... 359/568 |
| 2003/0193479 | A1 |   | 10/2003 | DuFaux |
| 2004/0108990 | A1 | * | 6/2004 | Lieberman et al. ........... 345/156 |
| 2008/0018591 | A1 |   | 1/2008 | Pittel et al. |

FOREIGN PATENT DOCUMENTS

| JP | 2002-244803 A | 8/2002 |
| WO | WO-01/59975 A2 | 8/2001 |
| WO | WO-01/93182 A1 | 12/2001 |

* cited by examiner

*Primary Examiner* — Lun-Yi Lao
*Assistant Examiner* — Jarurat Suteerawongsa
(74) *Attorney, Agent, or Firm* — Birch, Stewart, Kolasch & Birch, LLP

(57) ABSTRACT

Provided are a virtual optical input device and a method of controlling the same. In the method, a portion of an input means such as a finger, and a portion of a shadow of the input means generated by a light source are detected through image processing. Physical variations formed between them are used to detect the touch contact of the input means, calculate the position of the input means, and input the corresponding command. Accordingly, it is possible to provide various input patterns.

16 Claims, 21 Drawing Sheets

VIRTUAL OPTICAL INPUT DEVICE FOR PROVIDING VARIOUS TYPES OF INTERFACES AND METHOD OF CONTROLLING THE SAME

CROSS-REFERENCE TO RELATED APPLICATIONS

The present application claims priority under 35 U.S.C. 119 and 35 U.S.C. 365 to Korean Patent Application Nos. 10-2008-0013819 (filed on Feb. 15, 2008), 10-2008-0011495 (filed on Feb. 5, 2008), 10-2008-0075385 (filed on Aug. 1, 2008) and 10-2008-0075288 (filed on Jul. 31, 2008), which are hereby incorporated by reference in its entirety.

BACKGROUND

The present disclosure relates to a virtual optical input device capable of providing various types of interfaces and a method of controlling the same.

With recent development of semiconductor technology, an information communication apparatus has made much progress. Also, due to an information transmitting method of the information communication apparatus, an intuitive and efficient information transmitting method through characters and position information has increased in related art information communication apparatuses that have depended on simple voice signal transmission.

However, since input/output units of the information communication apparatus should be directly manipulated or recognized by a user, there is a limit in miniaturization and mobility.

Examples of an input device of a traditional information communication apparatus include a microphone for voice signals, a keyboard for inputting a specific key, and a mouse for inputting position input information.

Particularly, the keyboard and mouse is an optimized system for efficiently inputting characters or position information. However, since these units are poor in portability or mobility, substitutive devices are under development.

Various units such as a touchscreen, a touchpad, a pointing stick, and a simplified keyboard arrangement are being studied as the substitutive devices, but these devices have a limitation in operability and recognition.

SUMMARY

Embodiments provide a virtual optical input device that makes possible miniaturization of a structure and low power consumption so that it can be mounted inside a mobile communication apparatus, and that is not limited in flatness in a virtual optical input space, and a method of controlling the same.

In one embodiment, a virtual optical input device includes: a multi optical input pattern generator comprising a light source and a multi filter having a plurality of patterns formed therein, and irradiating light emitted from the light source onto the multi filter to form at least one of the patterns; an image receiver detecting and receiving an image of an input means and the formed optical input pattern; and an image processor detecting the position of the input means on the formed optical input pattern by use of the received image, and executing a command corresponding to the detected position of the input means.

In another embodiment, a method of controlling a virtual optical input device includes: forming at least one of two or more different optical input patterns, selected by a user, into a virtual optical input pattern; capturing an image of an input means over the virtual optical input pattern; calculating a portion of the input means, a portion of a shadow, and the related positions from the captured image; using the calculated position information to determine the contact of the input means; and executing a command corresponding to the contact point.

In further another embodiment, a virtual optical input device includes: a light source; a hologram pattern filter forming two or more different virtual optical input patterns according to the optical characteristics of light emitted from the light source; an image receiver detecting and receiving an image of an input means and the formed optical input pattern; and an image processor detecting the position of the input means on the formed optical input pattern by use of the received image, and executing a command corresponding to the detected position of the input means.

In still further another embodiment, a mobile device includes: a wireless communication unit performing wireless communication with a wireless communication system or another mobile device; a user input unit comprising a multi filter having a plurality of patterns formed therein, and receiving user input by detecting the contact between the position related to a portion of an input means and the position related to a portion of the shadow of the input means; a user input unit comprising an image processor; a display unit displaying information; a memory unit storing the input pattern and the corresponding command; and a control unit detecting the position of the input means on the formed optical input pattern by use of the received image, and executing a command corresponding to the detected position of the input means.

According to the present invention, a miniaturized virtual optical input device can be realized.

Also, according to the present invention, the number of parts used inside can be minimized, so that a virtual optical input device of low power consumption can be realized.

Also, according to the present invention, character inputting with excellent operability and convenience can be realized.

Also, according to the present invention, since the size of a virtual input space is not limited, the virtual input space can be variously used.

Also, since low power consumption and miniaturization are possible, a character input method of a mobile information communication apparatus can be developed remarkably.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1A:
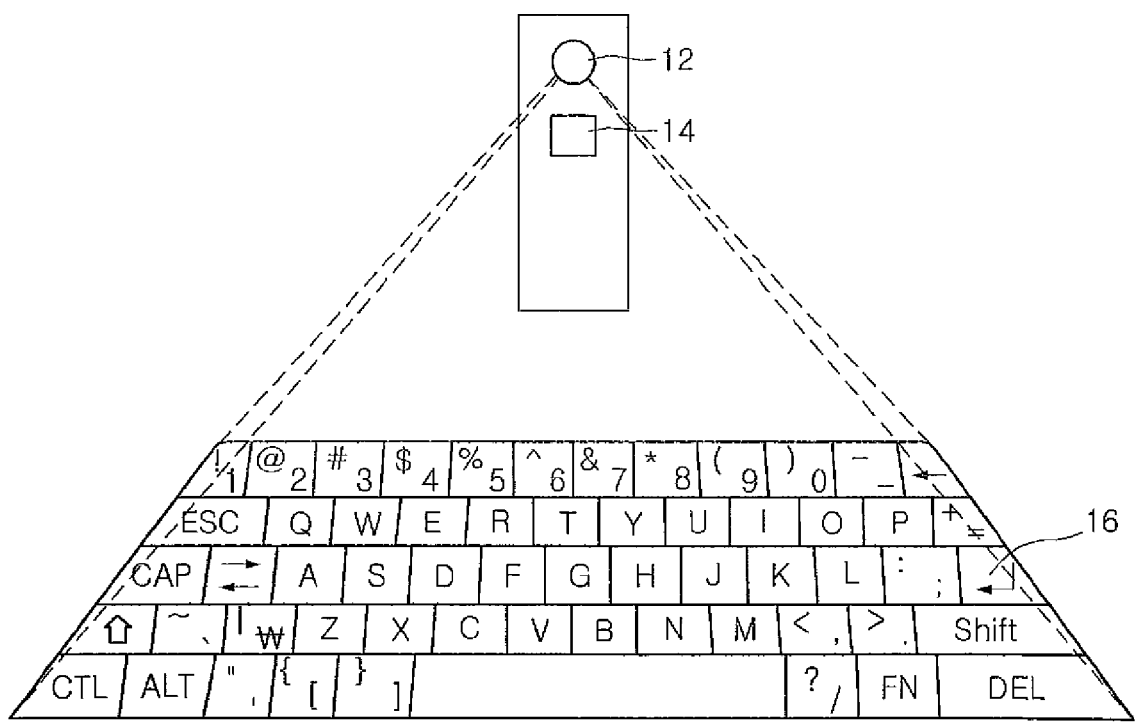
FIGS. 1A and 1B are respectively a front view and a side view of a virtual optical input device according to an exemplary embodiment.
Figure 1B:
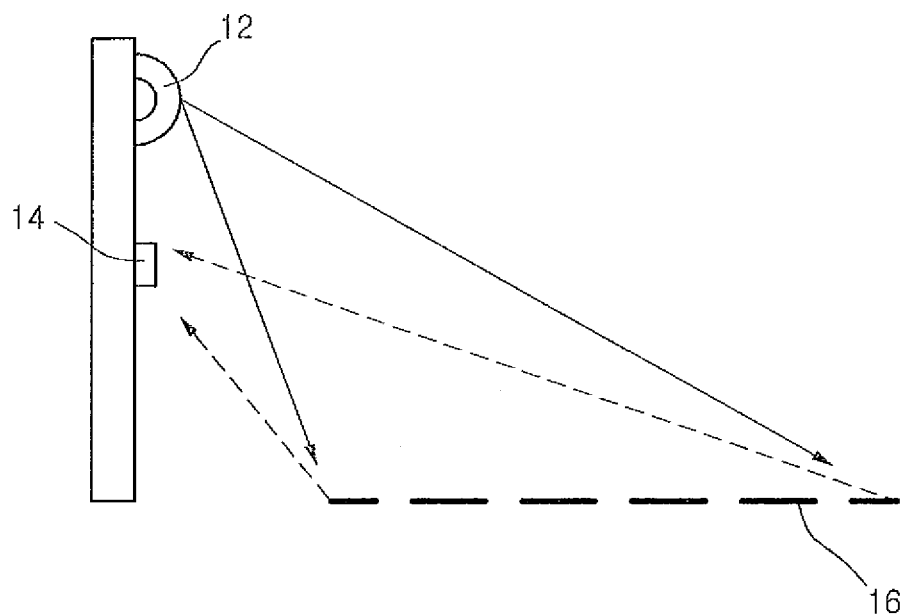

FIGS. 1A and 1B are respectively a front view and a side view of a virtual optical input device according to an exemplary embodiment.

Referring to FIGS. 1A and 1B, when light formed in a shape of a predetermined pattern is emitted from an optical input pattern generator 12, a virtual optical input pattern 16 is generated on a bottom. Though FIG. 1 exemplarily illustrates that a keyboard-shaped input pattern is formed, the present disclosure is not limited thereto but includes various types of input patterns that can replace a mouse and a touchpad.

Also, an input means in the specification includes all the devices used for performing a predetermined input operation using the virtual optical input device. Generally, the input means includes a human finger and may include other objects such as a stylus pen depending on embodiments.

Also, an image receiver 14 is separated by a predetermined distance below the optical input pattern generator 12. The image receiver 14 captures the virtual optical input pattern, the input means, and a shadow image corresponding to the input means.

The image receiver 14 may be disposed below the optical input pattern generator 12 so that an image excluding an image to be captured, that is, an image corresponding to a noise is not captured.

The image receiver 14 should have a suitable frame rate in order to capture the movement of the input means and determine whether the input means contacts or not. For example, the image receiver 14 may have a rate of about 60 frames/sec.

An image captured by the image receiver 14 is identified as the virtual input pattern, the input means, and the shadow image by an image processor (not shown). The image processor detects the positions of the input means and the shadow and executes a command corresponding to a contact point of the input means.

A method of identifying, by the image processor, each object from the received image, and a method of determining, by the image processor, whether the input means contacts will be described later.

Figure 2:
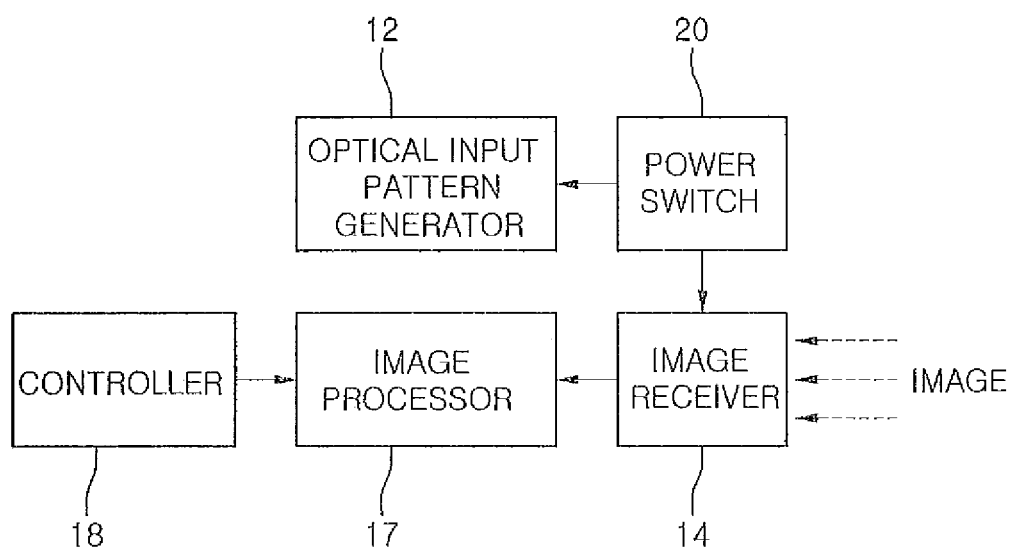
FIG. 2 is a block diagram of a virtual optical input device according to an exemplary embodiment.

FIG. 2 is a block diagram of a virtual optical input device according to an exemplary embodiment.

Referring to FIG. 2, the virtual optical input device includes an optical input pattern generator 12, an image receiver 14, an image processor 17, and a controller 18. The optical input pattern generator 12 generates a virtual optical input pattern. The image receiver 14 captures the input pattern generated by the optical input pattern generator 12, a portion of an input means, and a shadow image corresponding to the portion of the input means. The image processor 17 detects a position related with the portion of the input means and the portion of the shadow image from the image received by the image receiver 14, and executes a command corresponding to a contact point in the portion of the input means. The controller 18 controls the image processor 17 to execute the command corresponding to the contact point when the portion of the input means contacts the virtual input pattern.

Figure 3A:
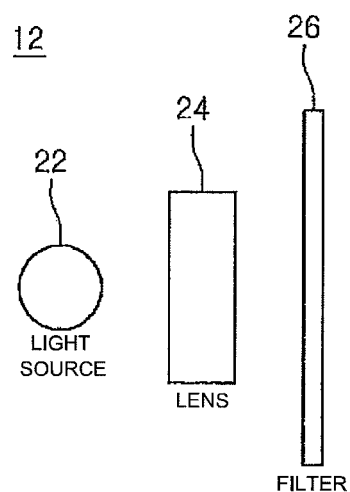
FIGS. 3A and 3B are schematic views illustrating the structure of an optical input pattern generator according to exemplary embodiments.

According to an exemplary embodiment, as illustrated in FIG. 3A, the optical input pattern generator 12 may include a light source 22, a lens 24 condensing light emitted from the light source 22, and a filter 26 passing light outputted from the lens 24 and having a pattern forming the optical input pattern.

Figure 3B:
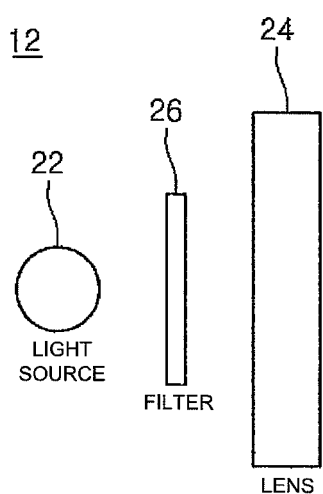

According to another exemplary embodiment, as illustrated in FIG. 3B, the filter 26 may be disposed between the light source 22 and the lens 24 to generate a virtual optical input pattern.

Examples of the light source 22 include various kinds of light sources such as a laser diode (LD) and a light emitting diode (LED). Light emitted from the light source 22 passes through the lens 24 and the filter 26 to generate a specific pattern in a virtual character input space. The light source 22 is configured to emit light having intensity that can be visually perceived by a user.

According to an exemplary embodiment, the light source 22 may be divided into a generation light source generating a visible light pattern that can be perceived by a user, and a detection light source generating invisible light for detecting a contact of the input means.

The lens 24 may be a collimate lens and allows light incident thereto to be visually perceived by a user and magnifies, corrects, and reproduces in a size that can be sufficiently used by the input means.

The filter 26 is a thin film type filter and includes a pattern corresponding to a virtual optical input pattern to be formed.

The image receiver 14 captures and receives a virtual optical input pattern generated by the optical input pattern generator 12, a portion of the input means, and a shadow corresponding to the portion of the input means.

The image receiver 14 may be realized using a camera module and may further include a lens at the front end of the image receiver 14 in order to allow an image to be formed on a photosensitive sensor inside the camera module. A complementary metal oxide semiconductor (CMOS) type photosensitive sensor may control a shooting speed depending on a shooting size. When the CMOS type photosensitive sensor is driven in a low resolution mode at a level that allows shooting of a human finger operation or speed, information required for implementing the present disclosure can be obtained.

The image processor 17 identifies the virtual optical input pattern, a portion of the input means, and a corresponding shadow image from an image received by the image receiver 14, and detects the positions of the portions of the input means and the shadow thereof or positions related thereto to execute a command corresponding to a contact point in the portion of the input means.

Also, when determining that the portion of the input means contacts the virtual optical input pattern, the controller 18 controls the image processor 17 to execute the command corresponding to the contact point.

Therefore, since a virtual optical input device can be realized using even a small number of parts, the input device can be miniaturized.

Figure 4A:
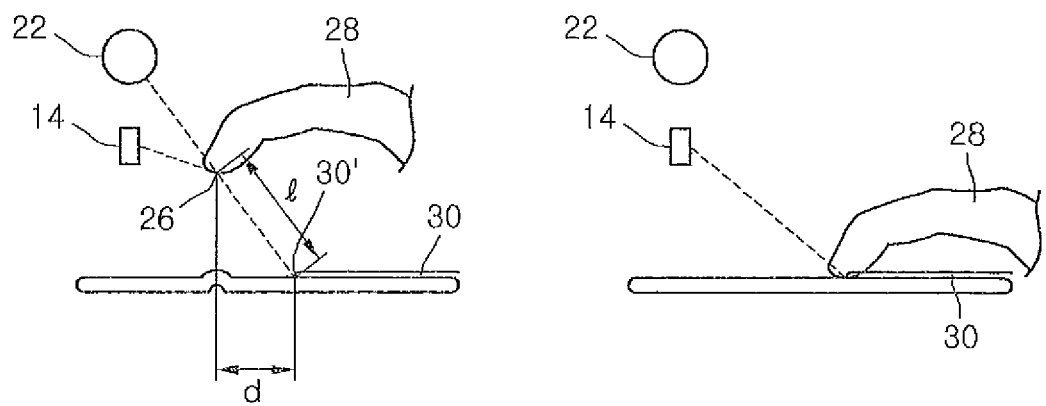
FIGS. 4A and 4B are views illustrating methods of determining whether a virtual optical input device contacts or not according to exemplary embodiments.
Figure 4B:
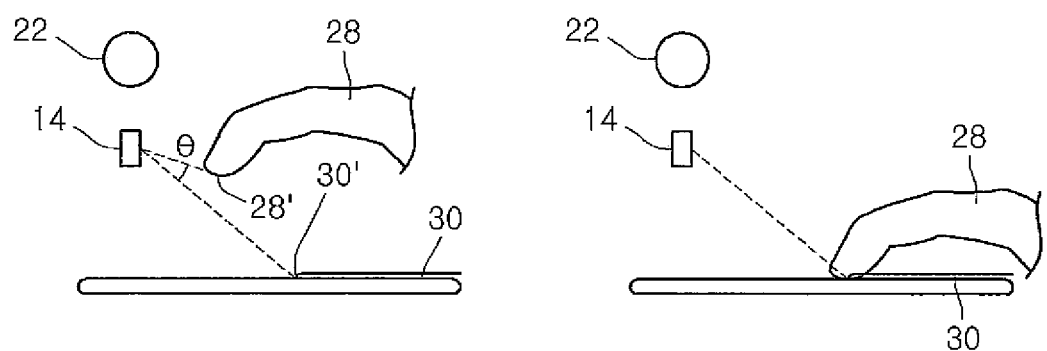

FIGS. 4A and 4B are views illustrating methods of determining whether a virtual optical input device contacts or not according to exemplary embodiments.

FIG. 4A is a view illustrating a method of determining whether the input means 28 contacts a bottom using a distance difference between a portion of the input means 28 and a shadow 30 generated by the portion of the input means 28. FIG. 4B is a view illustrating a method of determining whether the input means 28 contacts a bottom using an angle difference θ between the portion of the input means 28 and the shadow 30 generated by the portion of the input means 28.

The light source 22 is included in the optical input pattern generator 12 of FIG. 2, 3A or 3B. The lens 24 or the filter 26 of the optical input pattern generator 12 is omitted in FIGS. 4A and 4B for simplicity in description. The image receiver 14 separated by a predetermined distance below the optical input pattern generator 12 (i.e., the light source 22) captures an input pattern, an image of the input means 28, and a corresponding shadow image 30. Next, the image processor (not shown) identifies the input pattern, the image of the input means 28, and the corresponding shadow image 30 from the image received by the image receiver 14, and determines the positions of respective objects.

According to an exemplary embodiment, the image processor may determine whether the input means 28 contacts the bottom by detecting the portion of the input means 28 and the portion of the corresponding shadow 30, or the positions related thereto.

For example, the image processor may continuously detect the position of the end 28' of the input means 28 and the position of the end 30' of the shadow 30 from the received image.

According to an exemplary embodiment, the image processor may detect the position of a finger knuckle of the input means 28 or the shadow 30 in order to determine a contact of the input means 28.

Also, according to an exemplary embodiment, positions offset by a predetermined distance from the ends 28' and 30' of the input means 28 and the shadow 30 may be detected and used for determining a contact of the input means 28.

Also, according to the present disclosure, whether the input means 28 contacts or sufficiently comes close to the bottom may be determined on the basis of an arbitrary variable changing as the input means 28 comes close to the bottom such as angle relation, a relative velocity, or a relative acceleration besides distance relation between positions related with the portion of the input means 28 and the shadow 30 thereof.

Though a case of using position information of the end 28' of the input means 28 and the end 30' of the shadow 30 has been described in the specification, the above-described various reference values may be used in order to determine whether the input means contacts or sufficiently comes close to the bottom.

Since technology of identifying an object from a captured image is well known to those of ordinary skill in the art, detailed description thereof is omitted.

Also, since technology of identifying an object from an image captured through image processing and finding out a boundary line using a brightness difference between adjacent pixels is also well known to and widely used by those of ordinary skill in the art, descriptions of image processing methods required for calculating the positions of a portion of the input means 28 and the portion of the shadow image 30, or positions related thereto are omitted.

As illustrated in FIG. 4A, a distance difference between the end 28' of the input means 28 and the end 30' of the shadow 30, or a distance difference between positions related with the input means 28 and the shadow 30 is continuously calculated. When the calculated distance difference is 0, it may be determined that the input means 28 contacts the bottom. According to on an exemplary embodiment, when the calculated distance difference becomes a predetermined threshold value or less, it may be determined that the input means 28 contacts the bottom.

At this point, even in a case of detecting another portion related with the input means 28 or the shadow 30 instead of the ends 28' and 30' of the input means 28 or the shadow 30, a point when a distance between other portions related with the input means 28 or the shadow 30 is 0 or a predetermined threshold value or less may be detected.

Also, according to an exemplary embodiment, even in the case where the input means 28 does not actually contact the bottom, when the input means 28 comes close within a predetermined distance from the bottom, it may be determined that the input means contacts the bottom.

The distance may be determined using a straight line distance l between the end 28' of the input means 28 and the end 30' of the shadow, or using a horizontal distance d between a projected position of the bottom corresponding to the input means end 28' up to the shadow end 30'.

According to another exemplary embodiment, as illustrated in FIG. 4B, an angle θ between the input means end 28' and the shadow end 30' may be calculated to determine a contact of the input means 28. According to another exemplary embodiment, the contact of the input means may be determined on the basis of an angle between portions related with the input means 28 and the shadow 30.

As illustrated in the left portions of FIGS. 4A and 4B, when the input means 28 does not contact a space of a plane of the virtual optical input device, the distance l or d between the input means end 28' and the shadow end 30' has a non-zero value, or the angle θ between the input means end 28' and the shadow end 30' has a non-zero value.

However, when the input means 28 contacts the space of the plane of the virtual optical input device, the above values l, d, and θ become zero, and thus it may be determined that the input means 28 has contacted the plane.

As described above, according to an exemplary embodiment, when the above values l, d, and θ become a predetermined threshold value or less, it may be determined that the input means 28 contacts the plane.

As described above, when the input means 28 comes close within a predetermined distance to the plane though a contact does not actually occur, the input means may be determined to contact the plane and a subsequent process may be performed.

When a contact occurs, plane coordinates corresponding to a contact point may be calculated through image processing with reference to an image captured by the image receiver. When the controller orders a command corresponding to the coordinates of the contact point to be executed, the image processor executes the command.

According to an exemplary embodiment, as a reference for determining a contact of the input means 28, the relative velocities and accelerations of the input means end 28' and the shadow end 30' may be used.

For example, when the relative velocities of the input means end 28' and the shadow end 30' are zero, it may be determined that the positions of the two objects are fixed.

Assuming that a direction in which the input means end 28' and the shadow end 30' come close is a (+) direction, and a direction in which the input means end 28' and the shadow end 30' go away is a (−) direction, when the relative velocity has a (+) value, it may be determined that the input means 28 comes close. On the other hand, when the relative velocity has a (−) value, it may be determined that the input means 28 goes away.

That is, a relative velocity is calculated from continuously shot images over continuous time information. When the relative velocity changes from a (+) value to a (−) value in an instant, it is determined that a contact occurs. Also, when the relative velocity has a constant value, it is determined that a contact occurs.

Also, acceleration information is continuously calculated, and when a (−) acceleration occurs in an instant, it is determined that a contact occurs.

As described above, relative velocity information or acceleration information of other portions of the input means 28 and the shadow 30 or other positions related thereto may be calculated and used.

To realize a computer algorithm on the basis of the above-described technology, continuous time information (that is, continuous shot images) is required. For this purpose, a structure that can constantly store and perform an operation on extracted information may be provided.

Therefore, for this purpose, image processing of an image received by the image receiver 14 is required. For example, images can be extracted over three continuous times $t_0$, $t_1$, and $t_2$, and a velocity or acceleration can be calculated on the basis of the extracted images. Also, the continuous times $t_0$, $t_1$, and $t_2$ may be constant intervals.

Determining a contact of the input means 28 using the velocity information and the acceleration information can be used as a method of complementing a case where calculation and use of the distance information or the angle information are not easy.

As described above, according to the present disclosure, the input means 28 and the shadow 30 are identified from a captured entire image, so that positions thereof can be calculated. However, to identify each object from the captured entire image, a huge amount of operations are required and so a time may be delayed in identifying the images.

Figure 5:
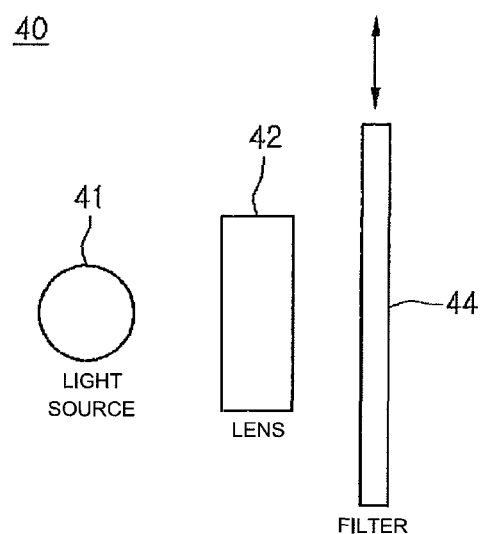
FIG. 5 illustrates a method of forming a multi pattern according to an exemplary embodiment.

FIG. 5 illustrates an optical input pattern generator 40 according to an exemplary embodiment. The optical input pattern generator 40 may be used as the optical input pattern generator 12 of FIG. 2.

Referring to FIG. 5, the multi optical input pattern generator 40 may include a light source 41, a lens 42 condensing light emitted from the light source 41, and a multi filter 44 passing light outputted from the lens 42 and having a plurality of patterns corresponding respectively to optical input patterns. As in FIGS. 3A and 3B, the positions of the lens 42 and the multi filter 44 may be interchangeable.

The multi filter 44 may be configured to be movable in the horizontal direction with respect to the light source 41 and the lens 12. Alternatively, the light source 41 may be configured to be movable with respect to the lens 42 and the multi filter 44.

If light emitted from the light source 41 is inputted through the lens 42 to the multi filter 44 with the patterns, an optical input pattern corresponding to the pattern located at the input point of the light may be formed on the bottom.

The multi optical input pattern generator 40 may further include a drive unit (not illustrated) for moving the position of the light source 41 or the positions of the patterns in the multi filter 44, in order to be able to select the pattern corresponding to the optical input pattern to be formed on the bottom, among the patterns of the multi filter 44.

FIGS. 6A to 6D illustrate embodiments of the multi filter 44 of the optical input pattern generator 40 illustrated in FIG. 5.

Figure 6A:
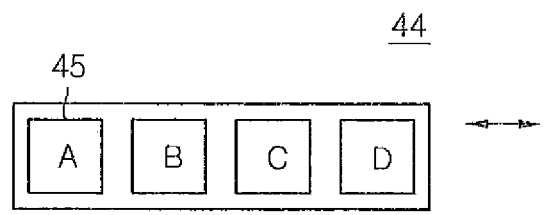
FIGS. 6A to 6D illustrate multi filters according to exemplary embodiments.

Referring to FIG. 6A, different shapes of patterns A, B, C and D are formed in the multi filter 44 in the lengthwise direction of the multi filter 44, and the multi filter 44 is moved in the lengthwise direction to change an optical input pattern 45 to be formed on the bottom.

Figure 6B:
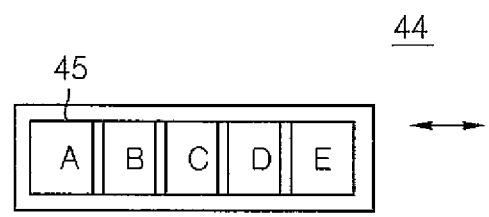

As illustrated in FIG. 6b, different shapes of patterns A, B, C and D may be formed in the multi filter 44 in such a way that their partial regions overlap each other.

The multi filter 44 can be more compacted by using the multi filter 44 of FIG. 6B.

Figure 6C:
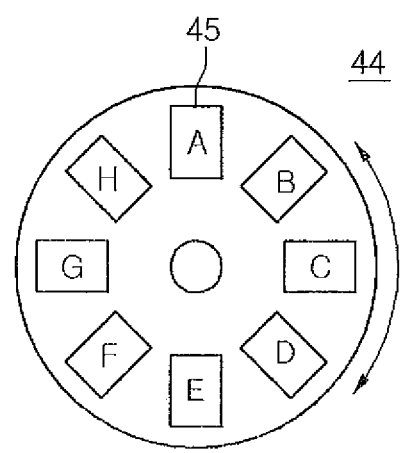

As illustrated in FIG. 6C, a plurality of patterns A, B, C, D, E, F, C and H are formed on a disk, and the disk is rotated to change an optical input pattern.

Figure 6D:
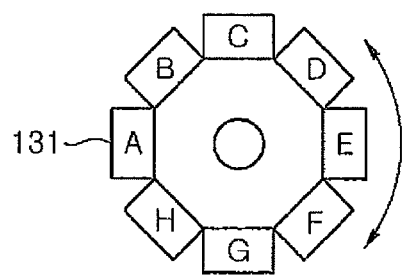

Also, as illustrated in FIG. 6D, a plurality of patterns A, B, C, D, E, F, G and H are coupled in a circular arrangement to construct a multi filter 44. Likewise, the multi filter 44 is rotated to change an optical input pattern to be formed on the bottom.

As described above, a plurality of patterns are formed in the multi filter 44 in various ways and the patterns are moved, so that various virtual optical input patterns can be generated without replacing the filter.

The methods of forming virtual optical input patterns and the structures of the multi filters, described with reference to FIGS. 6A to 6D, are merely exemplary embodiments. The arrangement and the number of patterns formed in the multi filter 44 and the method of shifting the patterns may vary depending on embodiments.

Figure 7:
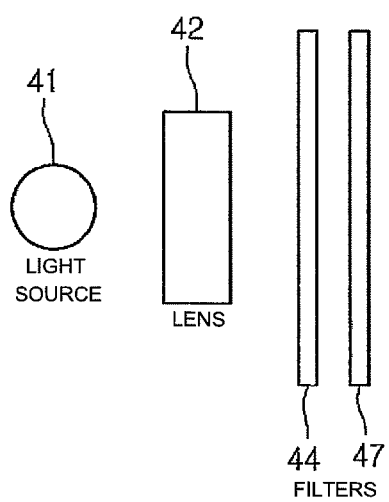
FIG. 7 illustrates the structure of a multi optical input pattern generator according to an exemplary embodiment.

FIG. 7 illustrates a multi optical input pattern generator 40 according to another exemplary embodiment.

As illustrated in FIG. 7, the optical input pattern generator 40 may include a light source 41, a lens 42, and two or more filters 44 and 47 arranged in the vertical direction with respect to the light source 41 and the lens 42. Also, at least one pattern may be formed in each of the filters 44 and 47.

The filters 44 and 47 are moved within a plane parallel to the light source 41 and the lens 42 to change the pattern and filter receiving light emitted from the light source 41, thereby changing the optical input pattern to be formed on the bottom.

Figure 8A:
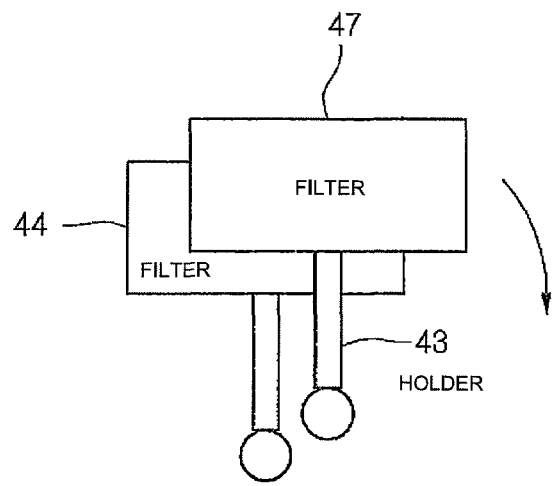
FIGS. 8A and 8B illustrate a method of generating a multi optical input pattern according to an exemplary embodiment by using the multi optical input pattern generator of FIG. 7.
Figure 8B:
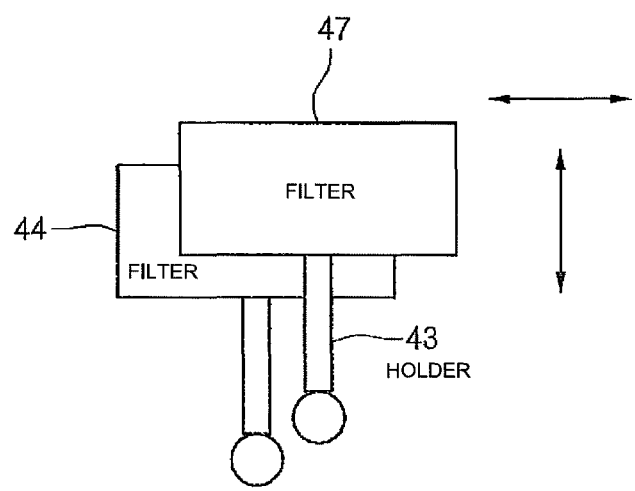

FIGS. 8A and 8B illustrate exemplary embodiments of the structure of the multi filter of the virtual optical input device illustrated in FIG. 7.

Referring to FIG. 8A, the filters 44 and 47 are rotated in an arrow direction within a plane parallel to the light source 41 and the lens 42 to change the filter receiving light emitted from the light source 41, thereby change the optical input pattern to be formed on the bottom.

For example, one pattern is formed in each of the filters 44 and 47, and at least one of the filters 44 and 47 is rotated to be located at the light input point, so that an optical input pattern corresponding to the pattern formed in the filter located at the light input point can be formed on the bottom.

For example, an English keyboard pattern and a Korean keyboard pattern may be formed in each of the filters 44 and 47. If filters are additionally provided, a Chinese keyboard pattern and a Japanese keyboard pattern may be formed respectively in the corresponding filters.

Also, if two or more patterns are formed in each of the filters 44 and 47, at least one of the filters 44 and 47 is rotated to change the pattern and the filter located at the light input point, so that an optical input pattern corresponding to the pattern located at the light input point can be formed on the bottom.

Each of the filters 44 and 47 is coupled to a holder 43, and the holder 43 is coupled to the drive unit to rotate the holder 43, thereby rotating the filters 44 and 47.

Referring to FIG. 8B, the filters 44 and 47 are moved in parallel to each other to change the filter receiving light emitted from the light source 41, thereby change the optical input pattern to be formed on the bottom.

Likewise, the holder 43 is shifted to move the filters 44 and 47.

Figure 9A:
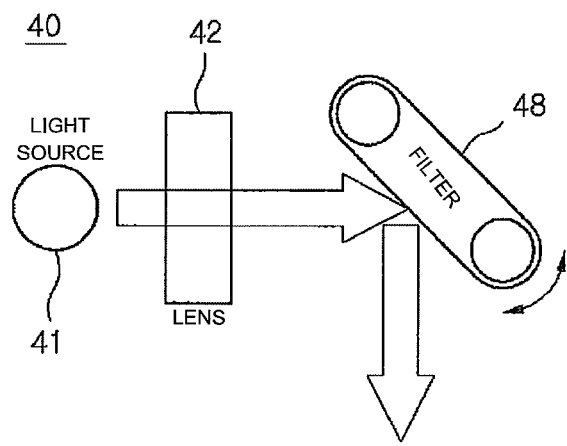
FIGS. 9A to 20 illustrate a method of generating a multi optical input pattern according to another exemplary embodiment.
Figure 9B:
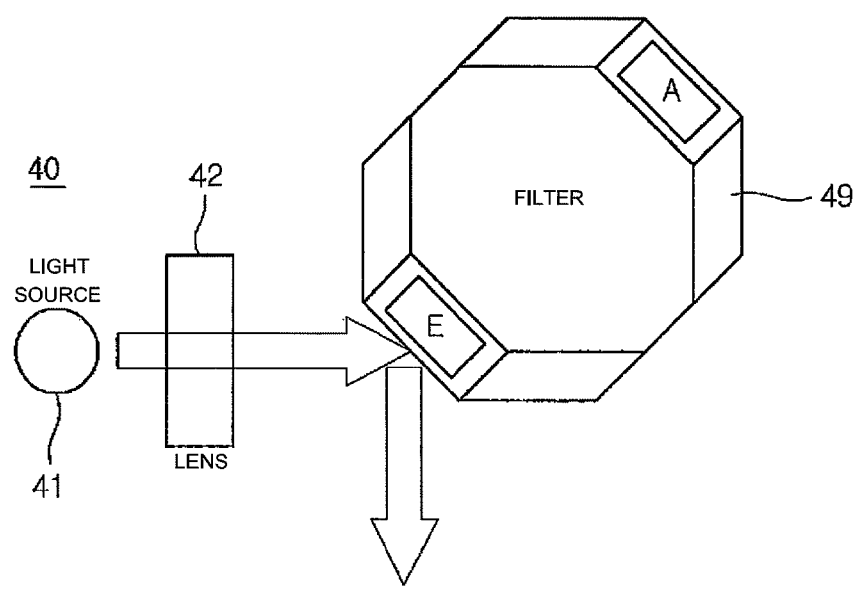

FIGS. 9A and 9B illustrate other exemplary embodiments of a multi optical input pattern generator 40.

Referring to FIG. 9A, a multi filter 44 may be embodied in the shape of a rotatory conveyor belt. A plurality of filters 48 are formed on a conveyor belt, and the conveyor belt is rotated to replace the filters.

Different shapes of patterns are formed on the outside of the filters 48, and light emitted from a light source 41 to pass through a lens 42 is reflected by the multi filters 48, so that an optical input pattern corresponding to the pattern formed at the light input point can be formed on the bottom.

For example, light emitted from the light source 41 is reflected toward the bottom by one of the multi filters 48, thereby changing the optical input pattern formed on the bottom.

Also, as illustrated in FIG. 9B, a filter 49 may be formed on each side of a hexagonal or polygonal rotating frame. The rotating frame is rotated to select the desired pattern. Light emitted from the light source 41 is reflected toward the bottom by one of the filters formed on the respective sides, thereby changing the optical input pattern formed on the bottom.

Various shapes may be possible as illustrated in FIGS. 6A and 9B.

The patterns formed in the multi filter 44, described with reference to FIGS. 7 to 9B may generate a virtual optical input pattern by using a hologram. Specifically, the patterns may be formed using a computer-generated hologram (CGH).

Figure 10:
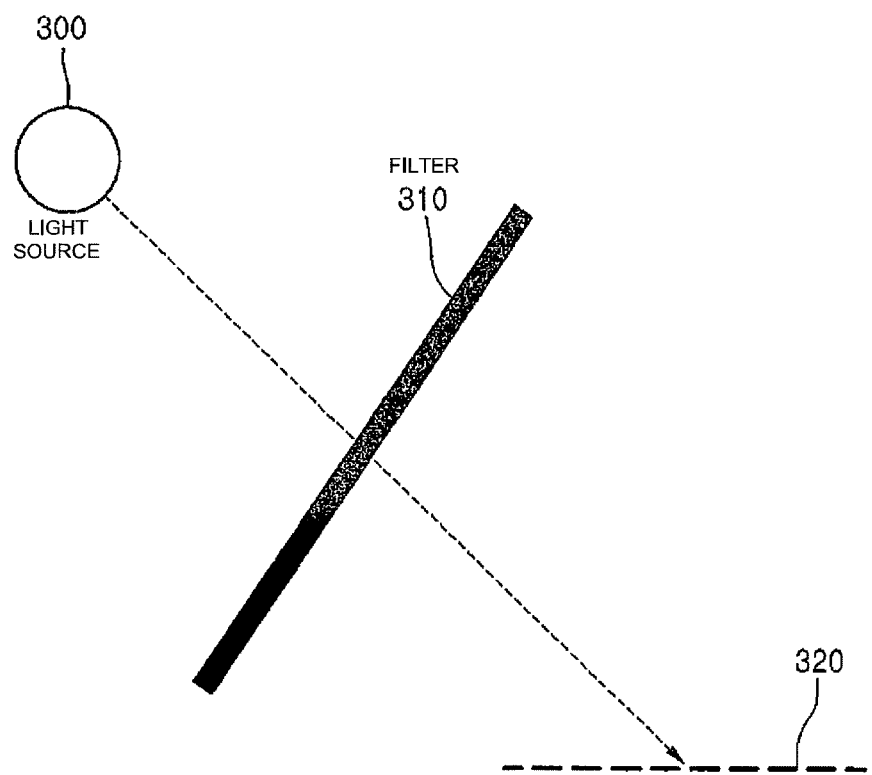

FIG. 10 illustrates an exemplary embodiment of the structure of an optical input pattern generator having a hologram pattern filter included in the virtual optical input device. The optical input pattern generator may include a light source 300 and a hologram pattern filter 310.

The light source 300 emits light toward the hologram pattern filter 310, and the hologram pattern filter 310 forms two or more different virtual optical input patterns according to the characteristics of input light, so that at least one input pattern 320 among the virtual optical input patterns can be formed on the bottom.

To this end, specific patterns corresponding to the characteristics of input light may be recorded in the hologram pattern filter 310.

The hologram pattern filter 310 is constructed using a holographic optical element (HOE). The shape of a pattern formed by the hologram pattern filter 310 may vary with a change in the characteristics of input light due to the characteristics of a holographic medium. Accordingly, the hologram pattern filter 310 can implement a variety of virtual optical input patterns in the same structure.

A holographic medium such as the hologram pattern filter 310 records two-dimensional optical patterns corresponding to optical characteristics, and reproduces an optical pattern corresponding to the optical characteristic if light is inputted. The use of such a storage method makes it possible to separately read data stored by a multiplexing technique in a spatially overlapping manner and to implement a page-based read operation that reproduces two-dimensional image simultaneously.

The hologram pattern filter 310 includes a plurality of books, and each book includes a plurality of pages formed in the same space, so that different data can be extracted according to the angles of incidence.

A predetermined page (i.e., a picture unit stored in one book) may be stored in a predetermined book (i.e., a predetermined space storing data). For example, an angle multiplexing technique, a phase multiplexing technique, or a wavelength multiplexing technique may be used as a method for recording/reproducing a pattern of a holographic medium.

That is, the characteristics of light, which makes it possible to select the input pattern 320 to be formed on the bottom among the optical patterns recorded in the hologram pattern filter 310, may include at least one of the incidence angle, the wavelength and the phase of the light.

Figure 11:
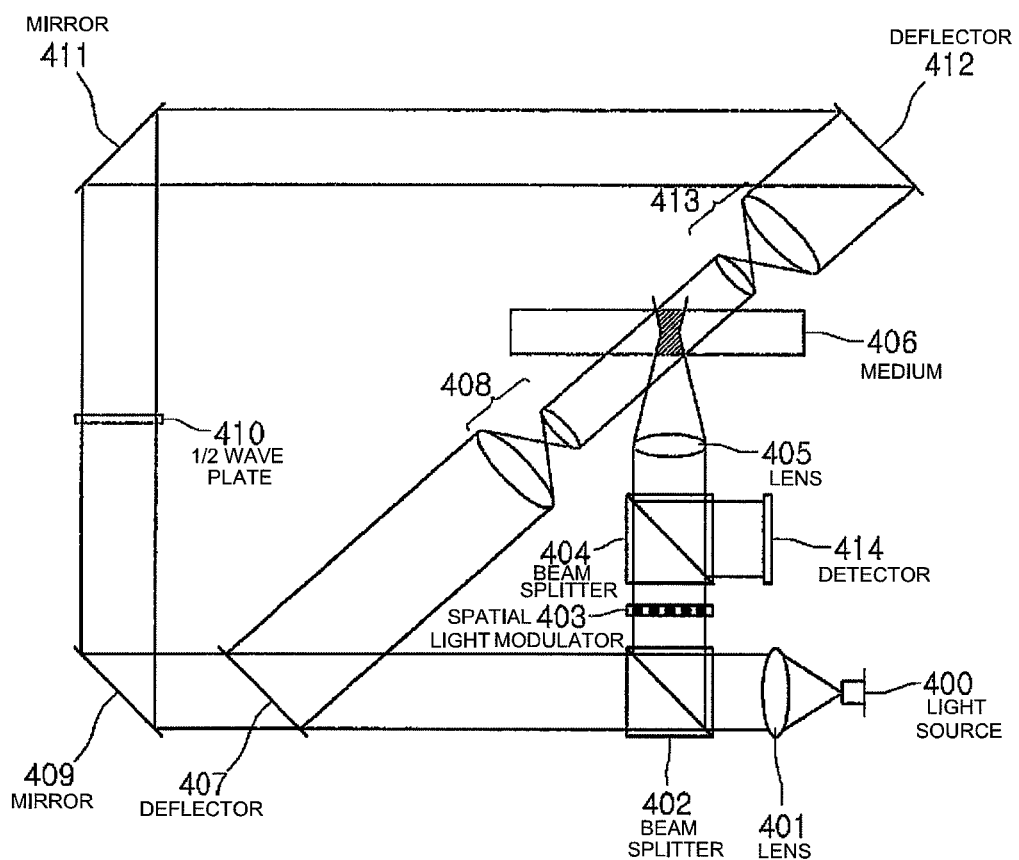

FIG. 11 is a block diagram of an optical system using a holographic medium according to an exemplary embodiment. With reference to FIG. 11, a description will be given of a method for recording/reproducing a plurality of patterns in the hologram pattern filter 310.

Referring to FIG. 11, the optical system using a holographic medium may include a light source 400, a collimate lens 401, a first beam splitter 402, a spatial light modulator 403, a second beam splitter 404, a lens 405, a first deflector 407, a first telescope 408, a first mirror 409, a half-wavelength plate 410, a second mirror 411, a second deflector 412, a second telescope 413, and a detector 414.

During the recording of a data page in the holographic medium, the half of reflection light generated by the light source 400 is transmitted by the first beam splitter 402 to the spatial light modulator 403. This reflection light portion is called signal light.

The half of reflection light generated by the light source 400 is deflected by the first deflector 407 toward the first telescope 408. This reflection light portion is called reference light. The signal light is spatially modulated by the spatial light modulator 403. The spatial light modulator 403 includes address-assignable elements that can be assigned addresses as a transparent region and an absorbent region corresponding to a data bit of '0' and a data bit of '1' in a data page to be recorded. After passing through the spatial light modulator 403, the signal light transmits a signal recorded in a holographic medium 406, that is, a data page to be recorded. Thereafter, the signal light is focused by the lens 405 onto the holographic medium 406.

The reference light is also focused by the first telescope 408 onto the holographic medium 406. Accordingly, a data page is recorded on the holographic medium 406 in the shape of an interference pattern as a result of the interference between the signal light and the reference light. When the data page is recorded on the holographic medium 406, another data page is recorded at the same position in the holographic medium 406. To this end, data corresponding to the data page are transmitted to the spatial light modulator 403. The first deflector 407 is rotated to change the angle of a reference signal for the holographic medium 406. During the rotation, the first telescope 408 is used to maintain the reference light at the same position. Accordingly, the interference pattern is recorded at the same position in the holographic medium 406 as another pattern. This is called angle multiplexing. The same position of the holographic medium 406 recording a plurality of data pages is called a book.

Alternatively, the wavelength of the reflection light may be controlled to record the same book data pages. This is called wavelength multiplexing. Other types of multiplexing such as shift multiplexing may also be used to record data pages on the holographic medium. In result, a multiplexing parameter must be changed to record a plurality of pages in the same book. Hereinafter, for example, the term "multiplexing parameter" is used to identify the specific wavelength of the light source 400 or the specific angle of the reference light for an information medium. Also, two or more types of multiplexing may be used to record the data pages. For example, the wavelength of the light source 400 and the angle of the reference light for an information medium may be changed to record various data pages in the same book.

In this example, a data page is recorded with a specific angle and a specific wavelength. In this case, the term "multiplexing parameter" is used to identify a compound angle-wavelength. That is, the term "multiplexing parameter" is used to identify parameters or variable parameters used to record a specific data page in a book.

During the reading of a data page in the holographic medium 406, the spatial light modulator 403 is made to be in a completely absorbent state, so that no portion of light can pass the spatial light modulator 403. The first deflector 407 is removed to transmit a portion of light, generated by the light source 400 to pass the beam splitter 402, to the second deflector 412 through the first mirror 409, the half-wavelength plate 410 and the second mirror 411. If an angle multiplexing technique is used to record data pages in the holographic medium 406 and if a given data page is desired to be read, the second deflector 412 is disposed such that the angle used to record a given hologram is identical to the angle of the second deflector 412 with respect to the holographic medium 406.

For example, if a wavelength multiplexing technique is used to record data pages in the holographic medium 406 and if a given data page is desired to be read, the same wavelength is used to read the given data page. That is, a data page is read from a multiplexing parameter identical to a multiplexing parameter used to record the data page.

Thereafter, the reference signal is diffracted by an information pattern to generate a reproduced signal light, and the reproduced signal light is transmitted to the detector 414 through the lens 405 and the second beam splitter 404. Accordingly, a data page with a formed image is formed on the detector 414, so that the data page is detected by the detector 414. The detector 414 has a plurality of pixel or detector components, and each of the detector components corresponds to one bit of the data page with the formed image.

FIGS. 12 to 19 illustrate optical input pattern generators having a hologram pattern filter according to other exemplary embodiments.

Figure 12:
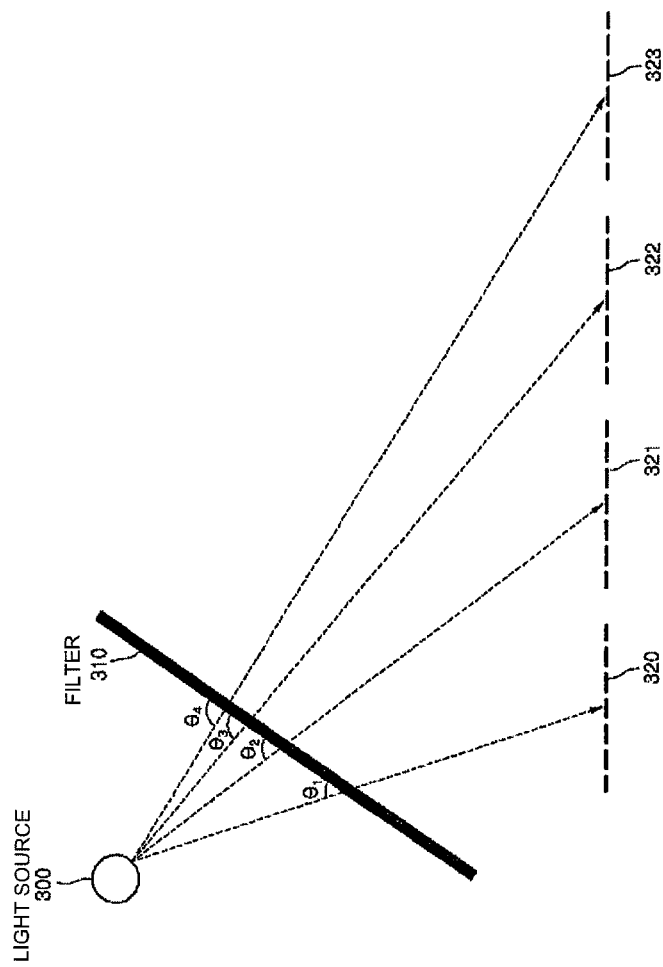

Referring to FIG. 12, different virtual optical input patterns 320, 321, 322 and 323 can be formed on the bottom by controlling an incidence angle θ of light that is inputted to a hologram pattern filter 310 after being emitted from a light source 300. To this end, an optical input pattern generator according to an exemplary embodiment may further include an incidence angle control unit (not illustrated) to change an incidence angle θ of light.

That is, a plurality of optical patterns are recorded in the hologram pattern filter 310, the light source 300 emits light with various output angles, and one of a plurality of virtual optical input patterns is passed according to the incidence angle of light inputted to the hologram pattern filter 310, thereby forming one or more selected virtual input patterns.

For example, four optical patterns corresponding to four incidence angles $\theta_1$, $\theta_2$, $\theta_3$ and $\theta_4$ may be recorded in the hologram pattern filter 310, and the light source 300 emits light with one of the four incidence angles $\theta_1$, $\theta_2$, $\theta_3$ and $\theta_4$.

If the incidence angle of light inputted to the hologram pattern filter 310 is $\theta_1$, an optical pattern recorded in the hologram pattern filter 310 is formed corresponding to the incidence angle $\theta_1$, so that a virtual optical input pattern 320 corresponding to the optical pattern is formed on the bottom.

Likewise, if the incidence angle of light inputted to the hologram pattern filter 310 is $\theta_2$, $\theta_3$ or $\theta_4$, an optical pattern recorded in the hologram pattern filter 310 corresponding to each of the incidence angles is formed on the bottom.

The number of optical patterns recorded in the hologram pattern filter 310 may be smaller or greater than 4, and two or more lights with different incidence angles may be omitted from the light source 300, so that two or more different virtual optical input patterns may be simultaneously formed on the bottom.

Also, the optical patterns recorded in the hologram pattern filter 310 may correspond to a combination of the wavelength and the incidence angle of light, so that the number of the optical patterns recorded in the hologram pattern filter 310 can be increased.

Figure 13:
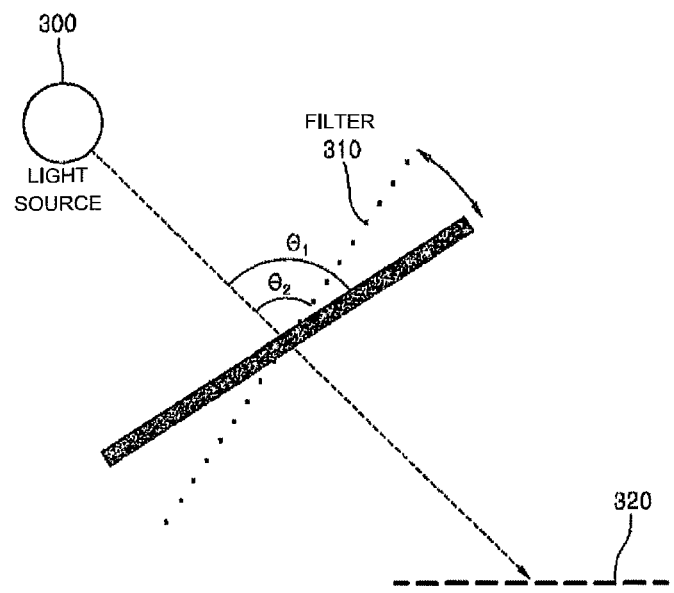

Referring to FIG. 13, a light source 300 generates the same light, and a hologram pattern filter 310 is rotated to control an incidence angle θ of light emitted from the light source 300, so that a plurality of virtual optical input patterns 320 can be formed on the bottom.

That is, if the incidence angle of light emitted from the light source 300 is $\theta_1$, an optical pattern recorded in the hologram pattern filter 310 is formed corresponding to the incidence angle $\theta_1$, so that a virtual optical input pattern 320 corresponding to the optical pattern is formed on the bottom.

Also, if the hologram pattern filter 310 is moved to make an incidence angle of light $\theta_1$, it is changed into a virtual optical input pattern 320 corresponding to the incidence angle $\theta_1$.

Figure 14:
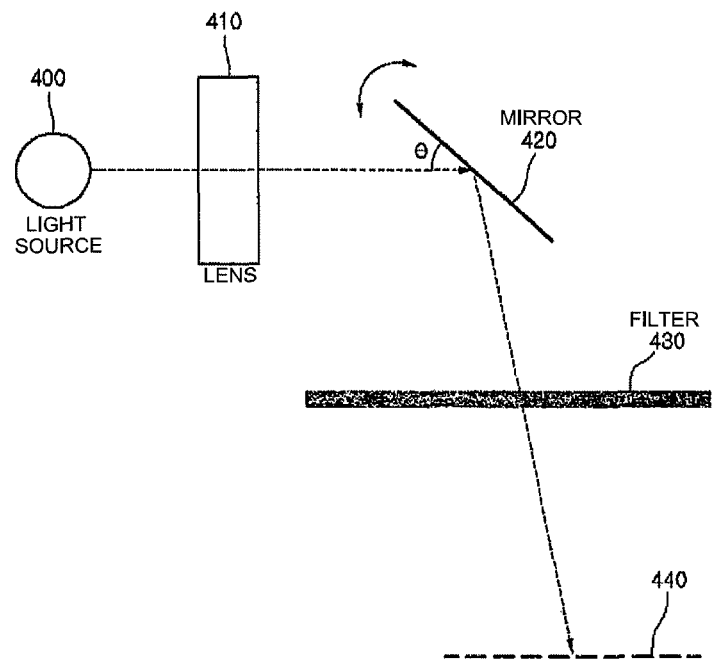

Referring to FIG. 14, an optical input pattern generator according to an exemplary embodiment may include a light source 400, a hologram pattern filter 430, and a mirror 420 disposed therebetween.

An angle θ of the mirror 420 is controlled, with the other components fixed, to control an incidence angle of light inputted to the hologram pattern filter 430, so that a plurality of virtual optical input patterns 440 can be formed on the bottom.

Also, as illustrated in FIG. 14, a lens 410 may be disposed between the light source 400 and the mirror 420. The optical input pattern generators illustrated in FIGS. 10, 12 and 13 may also have a lens disposed between the light source and the hologram pattern filter.

Figure 15:
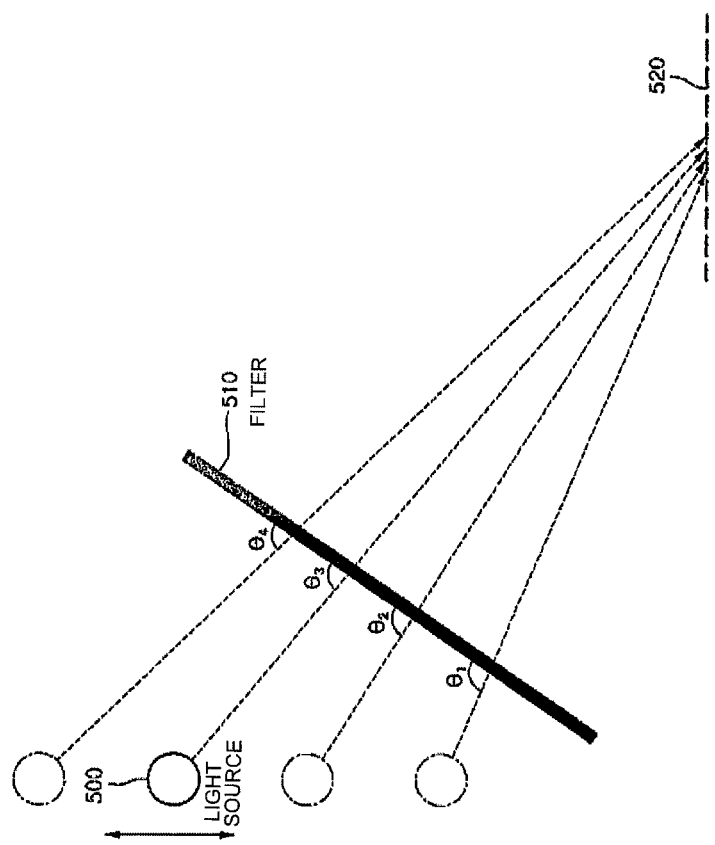

Referring to FIG. 15, a light source 500 is moved to control an incidence angle θ of light inputted to a hologram pattern filter 510, so that a virtual optical input pattern 520 formed on the bottom can have a plurality of patterns.

Figure 16:
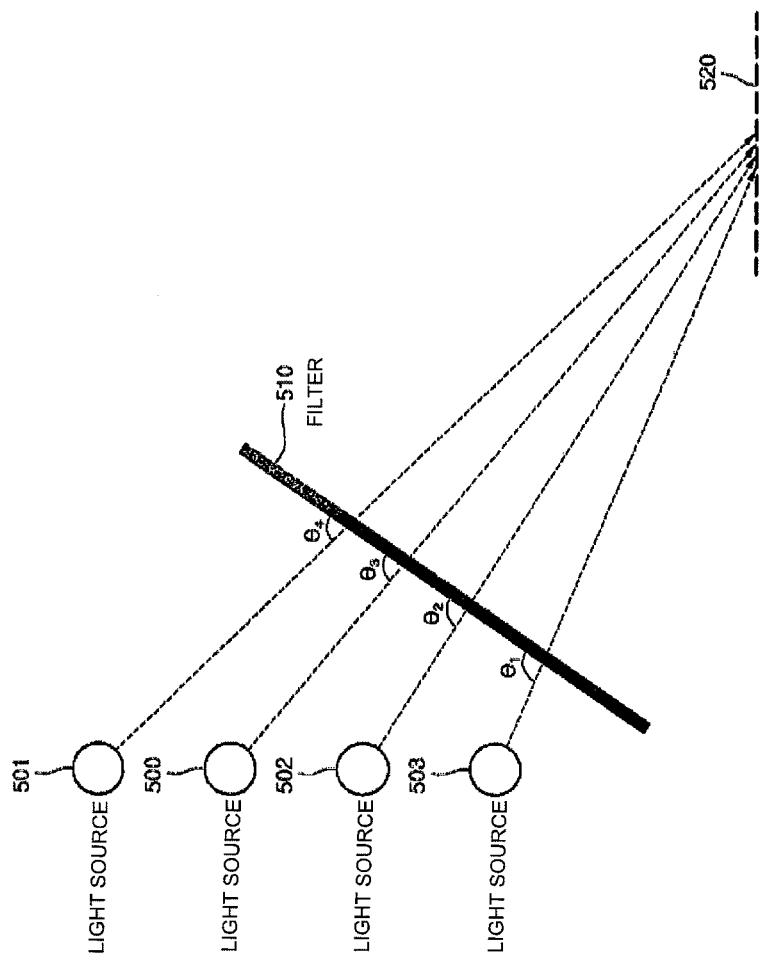

Referring to FIG. 16, an optical input pattern generator may include a plurality of light sources 500, 501, 502 and 503. At least one of the light sources 500, 501, 502 and 503 is used to emit light to a hologram pattern filter 510, and an incidence angle θ of light inputted to the hologram pattern filter 510 can be changed depending on the light source emitting the light. Because the positions of the light sources are different, the incidence angles θ on the hologram pattern filter 510 are different.

For example, the optical input pattern generator of FIG. 16 may further include a power control unit (not illustrated) that controls the power of the light sources 500, 501, 502 and 503. The power control unit may turn on only one of the light sources 500, 501, 502 and 503. Thus, only one of the light sources 500, 501, 502 and 503 may be turned on to input various angles of light to the hologram pattern filter 510, thereby forming different shapes of optical input patterns 520 on the bottom.

Also, if two or more of the light sources 500, 501, 502 and 503 emit light, two or more virtual optical input patterns can be simultaneously formed on the bottom.

Figure 17:
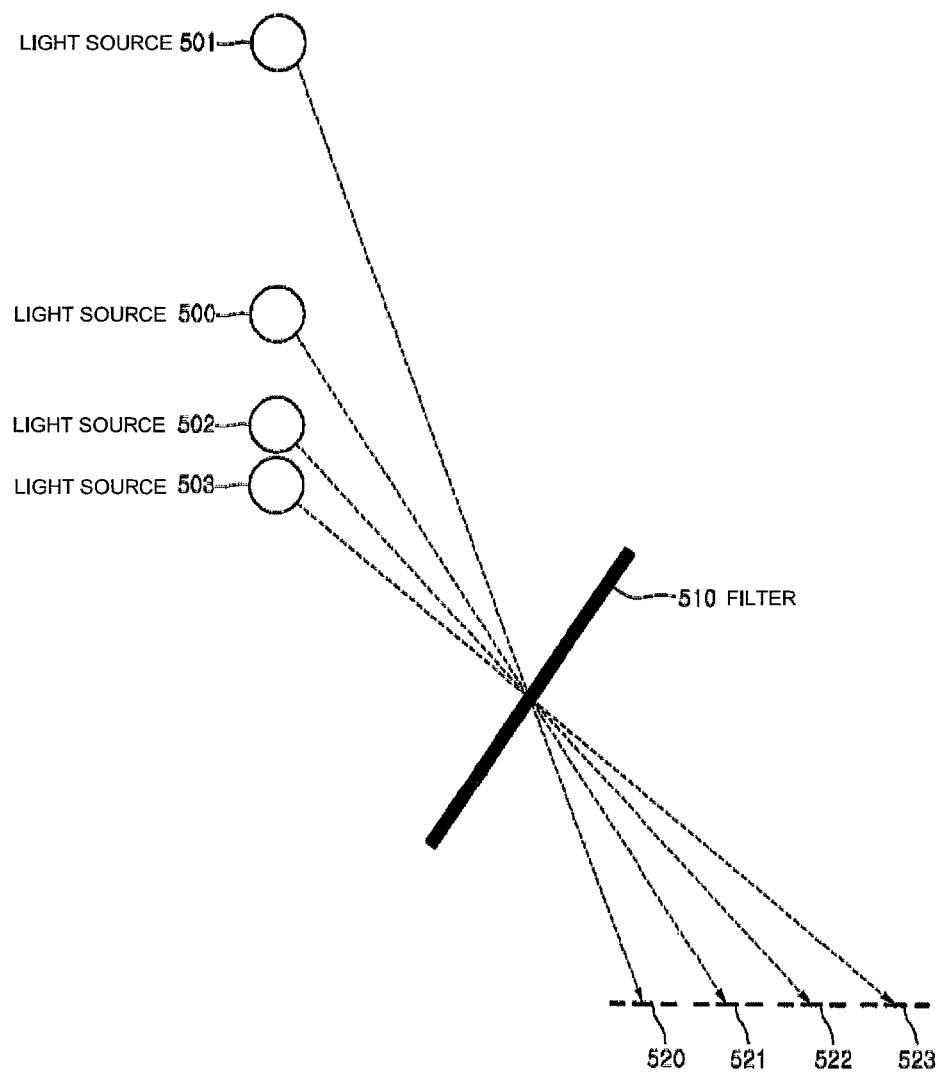

The positions of optical input patterns, formed on the bottom respectively by the light sources 500, 501, 502 and 503, may overlap with each other as illustrated in FIG. 16 or may not overlap with each other as illustrated in FIG. 17.

Figure 18:
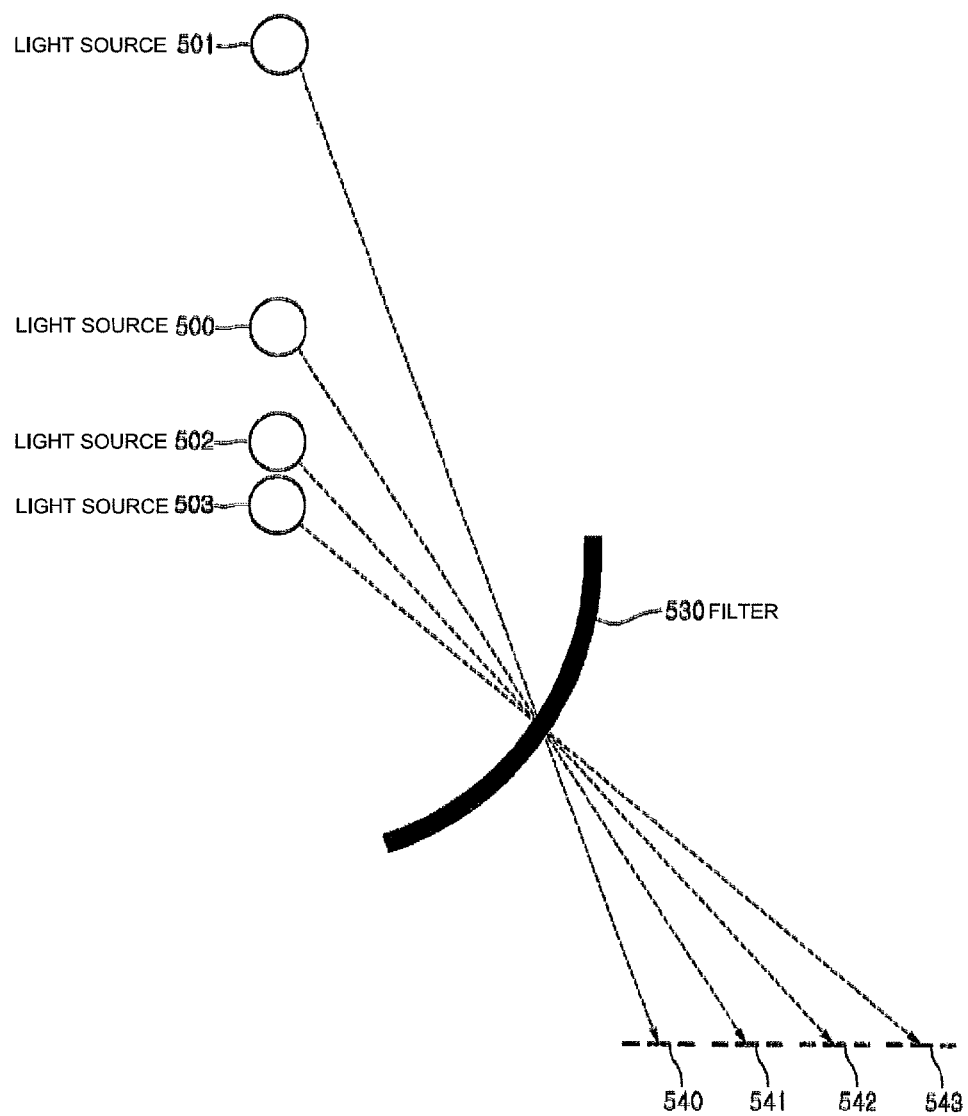

Referring to FIG. 18, a hologram pattern filter 530 is circular such that its section has a curved shape. Accordingly, it is possible to minimize an image distortion that may be generated when light emitted from light sources 500, 501, 502 and 503 passes through the hologram pattern filter 530.

Figure 19:
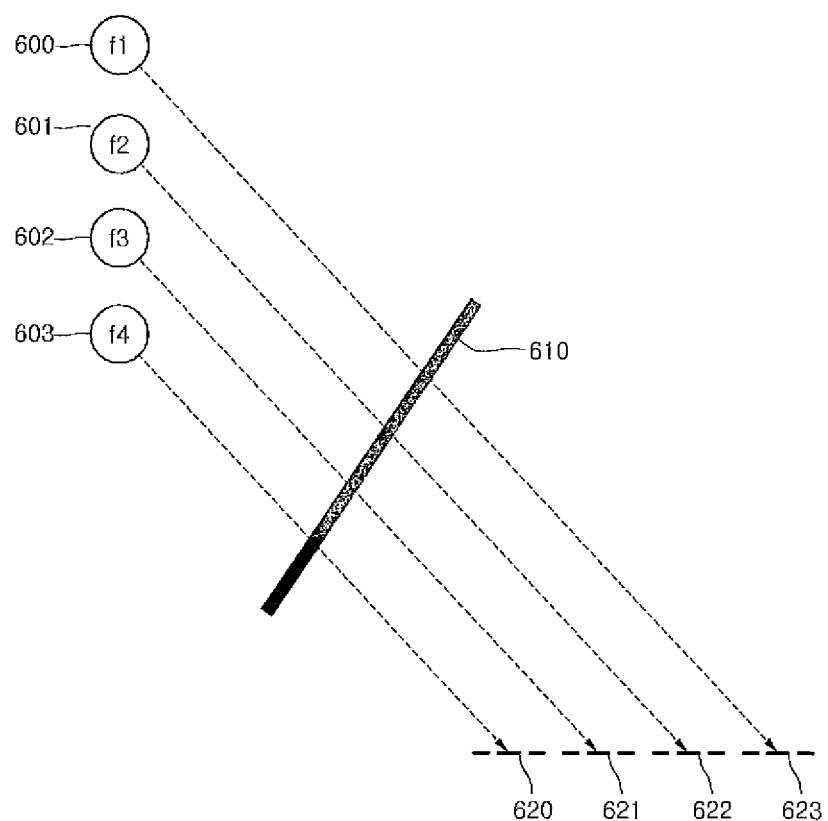

Referring to FIG. 19, an optical input pattern generator may include a plurality of light sources 600, 601, 602 and 603 that emit light of different wavelengths. At least one of the light sources 600, 601, 602 and 603 is used to emit light to a hologram pattern filter 610, so that a wavelength f of light inputted to the hologram pattern filter 610 can be controlled.

That is, a plurality of optical patterns according to light wavelengths is recorded in the hologram pattern filter 610, and at least one of the light sources 600, 601, 602 and 603 emits light with a wavelength corresponding to an optical pattern to be formed on the bottom, thereby forming one or more virtual input patterns selected among virtual optical input patterns.

For example, four optical patterns corresponding respectively to four incidence angles $f_1$, $f_2$, $f_3$ and $f_4$ may be recorded in the hologram pattern filter 810, and a power control unit (not illustrated) may turn on one of the light sources 600, 601, 602 and 603, thereby forming an optical pattern corresponding to the light wavelength of the turned-on light source among the optical patterns recorded in the hologram pattern filter 610.

Also, if two or more of the light sources 600, 601, 602 and 603 emit light, two or more optical input patterns corresponding respectively to the wavelengths of the emitted light can be simultaneously formed on the bottom.

Unlike the illustration of FIG. 19, the optical input pattern generator may include only one light source. In this case, the wavelength of light emitted from the light source may be controlled so that the optical input pattern generator can form a plurality of virtual optical input patterns.

The optical input pattern generator may include a plurality of light sources (not illustrated) that emit light of different phases. In this case, a plurality of virtual optical input patterns can be formed on the bottom according to the phase of light inputted to the hologram pattern filter.

It has been exemplarily described that the virtual optical input device forms a plurality of virtual optical input patterns by using the hologram pattern filter and controlling one of the incidence angle, wavelength and phase of light, to which the present invention is not limited. For example, a combination of two or more of the incidence angle, wavelength and phase of light may be used to form virtual optical input patterns.

Figure 20:
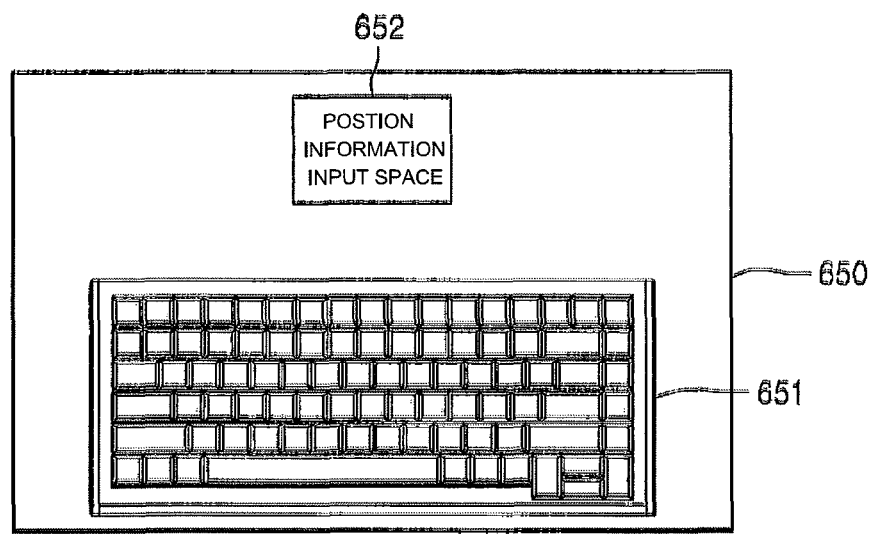

Referring to FIG. 20, a virtual optical input pattern 650 may include two input spaces 651 and 652 that are spatially separated. For example, the input spaces 651 and 652 may correspond respectively to a data input space (such as a keyboard) and a position information input space such as a mouse or a touchpad.

This configuration turns on two of the aforesaid light sources emitting light with different characteristics, so that two input patterns can be disposed in different spaces and an optical pattern recorded in the hologram pattern filter can be formed into two different separate optical patterns.

The position information input space 652 may be used as a virtual device such as a mouse or a touchpad in an embodiment that needs relative coordinates of a user input unit. The key information input space 651 may be used as a virtual device such as a keyboard in an embodiment that needs absolute coordinates of a user input unit.

The information calculating algorithms of the two spaces are different from each other. The position information input space 652 uses a relative motion vector to calculate the position shift information of a touching finger tip in the previous photograph image and the current photograph image, thereby calculating the position information on the screen.

On the other hand, the key information input space 651 detects and calculates the position where a key input event occurs in the current photograph image.

Thus, a switch between two modes is necessary, and the previous image state and the current image state are determined to determine the mode of a virtual input device controlled by a user, thereby controlling the device.

That is, referring to FIG. 2, when the image receiver 14 captures and receives an image, the image processor 17 detects the position of an input means such as a finger and determines the space where the detected finger position is present, thereby switching to a suitable mode.

If the detected finger position is present in the key information input space 651, an efficient information calculation can be made with a smaller amount of arithmetic operation because the controller 18 has only to perform an arithmetic operation on the key information input space 651.

The control method of the virtual optical input device according to the embodiment can be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

The virtual input unit according to embodiments can be applied to various types of mobile devices and non-mobile devices. Examples of the mobile devices include cellular phones, smart phones, notebook computers, digital broadcasting terminals, personal digital assistants (PDAs), portable multimedia players (PMPs), and navigators.

Figure 21:
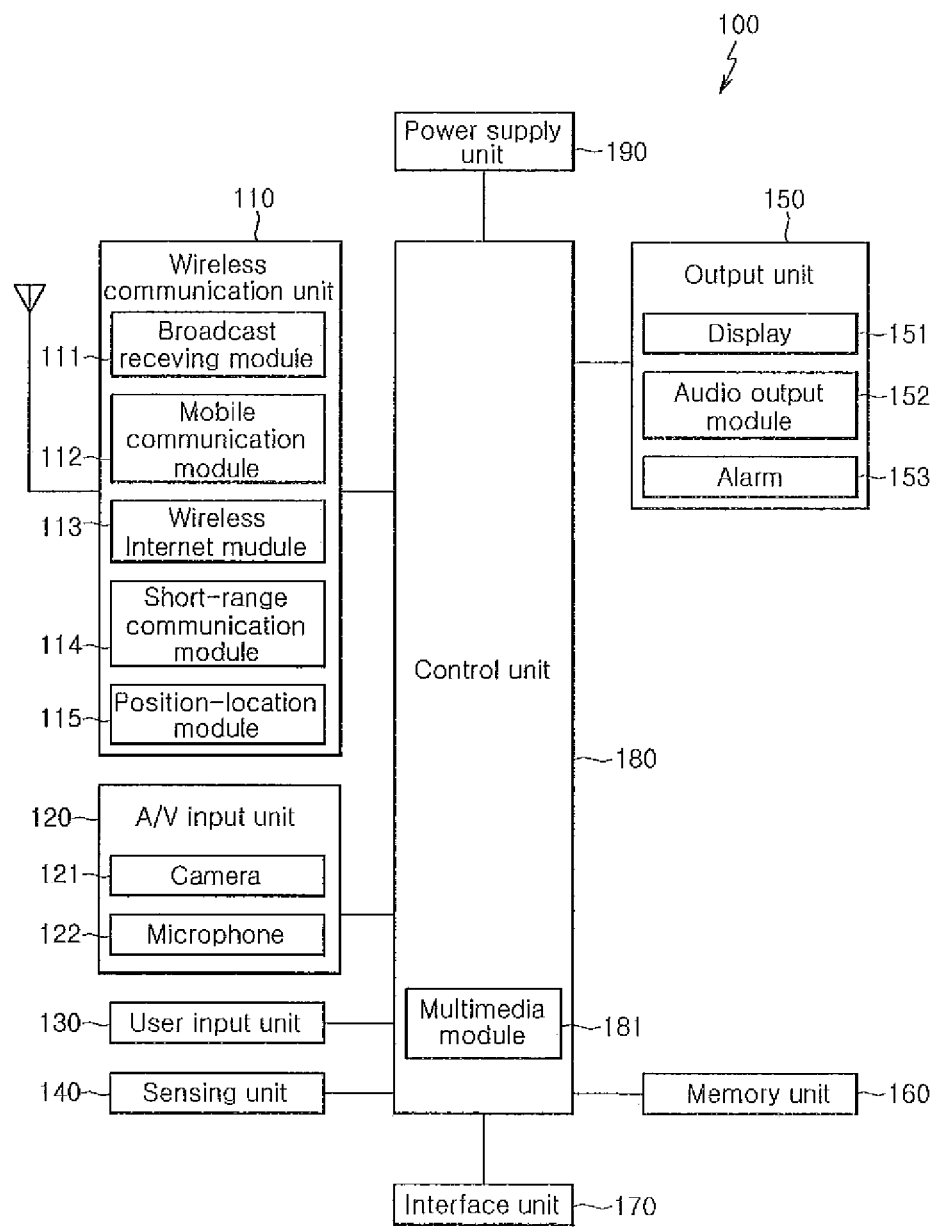
FIG. 21 is a block diagram of a mobile device according to an exemplary embodiment.

FIG. 21 is a block diagram of a mobile device 100 according to an exemplary embodiment. The mobile device may be implemented using a variety of different types of devices. Examples of such devices include mobile phones, user equipment, smart phones, computers, digital broadcast devices, personal digital assistants, portable multimedia players (PMP) and navigators. By way of non-limiting example only, further description will be with regard to a mobile device. However, such teachings apply equally to other types of devices. FIG. 21 shows the mobile device 100 having various components, but it is understood that implementing all of the illustrated components is not a requirement. Greater or fewer components may alternatively be implemented.

FIG. 21 shows a wireless communication unit 110 configured with several commonly implemented components. For instance, the wireless communication unit 110 typically includes one or more components which permits wireless communication between the mobile device 100 and a wireless communication system or network within which the mobile device is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory unit 160.

The mobile communication module 112 transmits/receives wireless signals to/from one or more network entities (e.g., base station, Node-B). Such signals may represent audio, video, multimedia, control signaling, and data, among others.

The wireless Internet module 113 supports Internet access for the mobile device. This module may be internally or externally coupled to the device.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile device. If desired, this module may be implemented using global positioning system (GPS) components which cooperate with associated satellites, network components, and combinations thereof.

Audio/video (A/V) input unit 120 is configured to provide audio or video signal input to the mobile device. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory unit 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a touch screen panel, a jog wheel and a jog switch.

The virtual optical input device according to the present invention can be used as part of the user input unit 130.

The sensing unit 140 provides status measurements of various aspects of the mobile device. For instance, the sensing unit may detect an open/close status of the mobile device, relative positioning of components (e.g., a display and keypad) of the mobile device, a change of position of the mobile device or a component of the mobile device, a presence or absence of user contact with the mobile device, orientation or acceleration/deceleration of the mobile device.

The sensing unit 140 may comprise an inertia sensor for detecting movement or position of the mobile device such as a gyro sensor, an acceleration sensor etc or a distance sensor for detecting or measuring the distance relationship between the user's body and the mobile device.

The interface unit 170 is often implemented to couple the mobile device with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile device. Display 151 is typically implemented to visually display information associated with the mobile device 100. For instance, if the mobile device is operating in a phone call mode, the display will generally provide a user interface or graphical user interface which includes information associated with placing, conducting, and terminating a phone call. As another example, if the mobile device 100 is in a video call mode or a photographing mode, the display 151 may additionally or alternatively display images which are associated with these modes.

A touch screen panel may be mounted upon the display 151. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile device may include one or more of such displays.

FIG. 21 further shows an output unit 150 having an audio output module 152 which supports the audio output requirements of the mobile device 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile device. Typical events include call received, message received and user input received. An example of such output includes the providing of tactile sensations (e.g., vibration) to a user. For instance, the alarm 153 may be configured to vibrate responsive to the mobile device receiving a call or message. As another example, vibration is provided by alarm 153 as a feedback responsive to receiving user input at the mobile device, thus providing a tactile feedback mechanism. It is understood that the various output provided by the components of output unit 150 may be separately performed, or such output may be performed using any combination of such components.

The memory unit 160 is generally used to store various types of data to support the processing, control, and storage requirements of the mobile device. Examples of such data include program instructions for applications operating on the mobile device, contact data, phonebook data, messages, pictures, video, etc. The memory unit 160 shown in FIG. 21 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The control unit 180 typically controls the overall operations of the mobile device. For instance, the controller performs the control and processing associated with voice calls, data communications, video calls, camera operations and recording operations. If desired, the controller may include a multimedia module 181 which provides multimedia playback. The multimedia module may be configured as part of the control unit 180, or this module may be implemented as a separate component.

The power supply unit 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by control unit 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory unit 160), and executed by a controller or processor (for example, control unit 180).

The mobile device 100 of FIG. 21 may be configured to operate within a communication system which transmits data via frames or packets, including both wireless and wired communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 22:
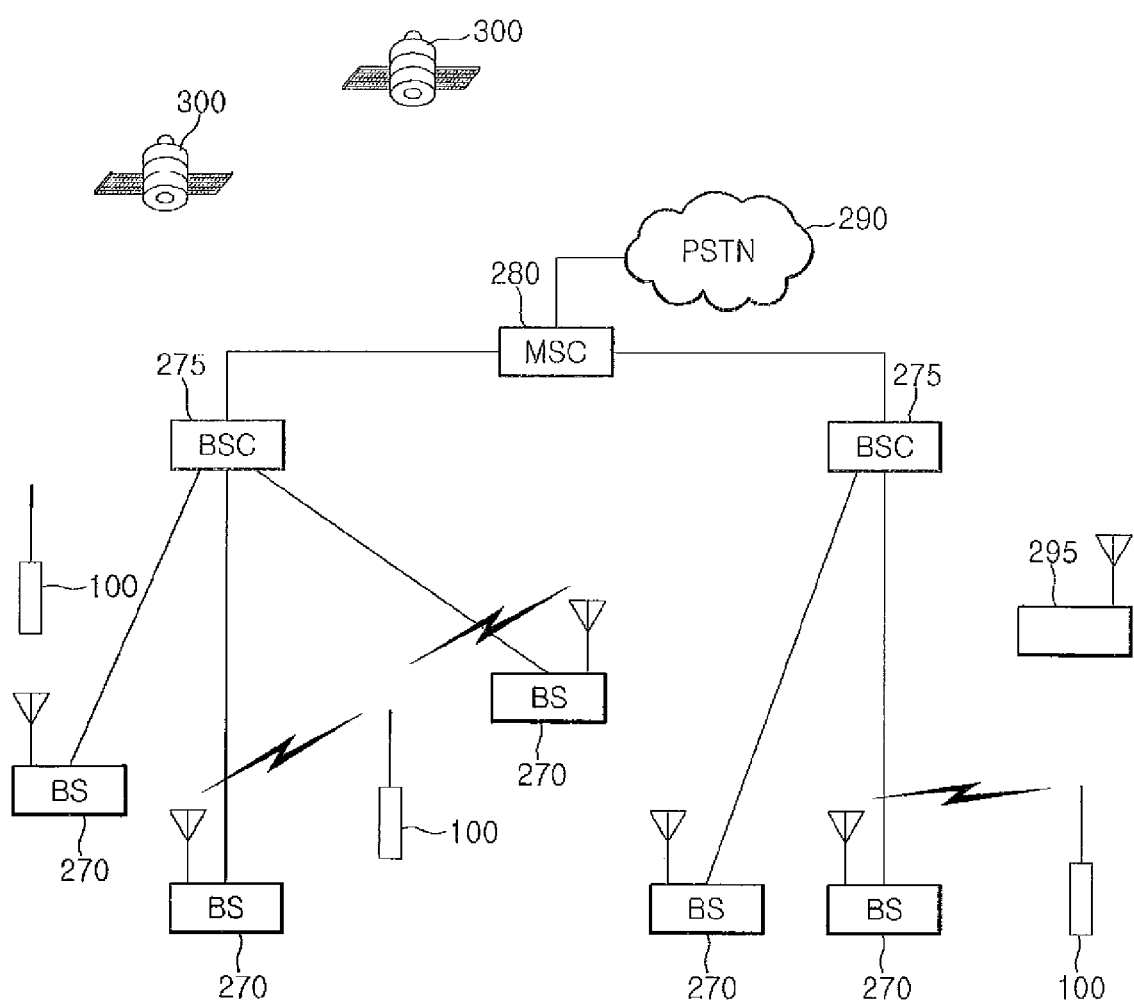
FIG. 22 is a block diagram of a CDMA wireless communication system to which the mobile device of FIG. 21 can be applied.

Referring now to FIG. 22, a CDMA wireless communication system is shown having a plurality of mobile devices 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable/mobile devices 100 operating within the system. The broadcast receiving module 111 (FIG. 21) of the portable device is typically configured to receive broadcast signals transmitted by the DMB transmitter 295. Similar arrangements may be implemented for other types of broadcast and multicast signaling (as discussed above).

FIG. 22 further depicts several global positioning system (GPS) satellites 300. Such satellites facilitate locating the position of some or all of the portable devices 100. Two satellites are depicted, but it is understood that useful positioning information may be obtained with greater or fewer satellites. The position-location module 115 (FIG. 21) of the portable device 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile devices 100. The mobile devices 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile devices 100.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A virtual optical input device comprising:
   a multi optical input pattern generator including a light source and a plurality of filters, wherein the plurality of filters having changeable relative location are located in a light path, each filter has at least one pattern, change of relative location between the plurality of filters forms a plurality of combinations, the plurality of combinations generates a plurality of virtual optical input patterns, respectively, and the light source irradiates a light of the light path onto one combination of the plurality of filters to form one of the plurality of virtual optical input patterns by the one combination of the plurality of filters;
   an image receiver configured to detect and receive an image of an input means and a formed virtual optical input pattern; and
   an image processor configured to detect the position of the input means on the formed virtual optical input pattern by use of the received image, and execute a command corresponding to the detected position of the input means.

2. The virtual optical input device according to claim 1, wherein the image processor identifies a shadow image of the input means, the input means, and the formed virtual optical input pattern from the received image, and uses the identified input means and the position of the shadow to determine whether the input means contacts the formed virtual optical input pattern.

3. The virtual optical input device according to claim 2, further comprising a controller configured to control the image processor to execute a command corresponding to the contact point if the input means contacts the formed virtual optical input pattern.

4. The virtual optical input device according to claim 1, wherein the multi optical input pattern generator further includes a lens condensing the light emitted from the light source.

5. The virtual optical input device according to claim 1, wherein the multi optical input pattern generator further includes a drive unit moving the plurality of filters to irradiate the light onto the combination of the plurality of filters.

6. The virtual optical input device according to claim 5, wherein the drive unit moves the plurality of filters up/down, right/left, or circularly.

7. The virtual optical input device according to claim 1, wherein the plurality of patterns are formed in each of the plurality of filters in a line or in a circular fashion.

8. The virtual optical input device according to claim 1, wherein the light emitted from the light source passes the combination of the plurality of filters to form at least one virtual optical input pattern corresponding to the pattern formed at the light passing position.

9. The virtual optical input device according to claim 1, wherein the light emitted from the light source is reflected by the combination of the plurality of filters to form at least one virtual optical input pattern corresponding to the pattern formed at the light reflecting position.

10. The virtual optical input device according to claim 1, wherein at least one of the patterns formed in the plurality of filters is a holographic pattern.

11. The virtual optical input device according to claim 1, wherein the two adjacent patterns formed in the plurality of filters overlap each other at least partially.

12. A method of controlling a virtual optical input device, wherein the virtual optical input device has a light source and a plurality of filters, the plurality of filters having changeable relative location are located in a light path, each filter has at least one pattern, change of relative location between the plurality of filters forms a plurality of combinations, the plurality of combinations generates a plurality of virtual optical input patterns, respectively, the method comprising:
   irradiating, by the light source, a light of the light path onto one of the plurality of combinations to form one of the plurality of virtual optical input patterns by one of the plurality of combinations;
   capturing an image of an input means over a formed virtual optical input pattern;
   calculating a portion of the input means, a portion of a shadow, and the related positions from the captured image;
   using the calculated position information to determine the contact of the input means; and
   executing a command corresponding to the contact point.

13. A non-transitory computer-readable recording medium configured to store a program that executes the method of claim 12.

14. A mobile device comprising:
   a wireless communication unit configured to perform wireless communication with a wireless communication system or another mobile device;
   a user input unit including a light source and a plurality of filters, wherein the plurality of filters having changeable relative location are located in a light path, each filter has at least one pattern, change of relative location between the plurality of filters forms a plurality of combinations, the plurality of combinations generates a plurality of virtual optical input patterns, respectively, the light source irradiates a light of the light path onto one combination of the plurality of filters to form one of the plurality of virtual optical input patterns by the one combination of the plurality of filters;

an image processor;

a display unit displaying information;

a memory unit configured to store the plurality of virtual optical input patterns and the corresponding command; and a control unit configured to detect the position of the input means on the formed virtual optical input pattern by use of the received image, and execute a command corresponding to the detected position of the input means.

15. The mobile device according to claim 14, wherein the user input unit further comprises:

a multi optical input pattern generator including the light source and the plurality of filters, wherein the plurality of filters having changeable relative location are located in a light path, each filter has at least one pattern, change of relative location between the plurality of filters forms the plurality of combinations, the plurality of combinations generates the plurality of virtual optical input patterns, respectively, the light source irradiates a light of the light path onto one combination of the plurality of filters to form one of the plurality of virtual optical input patterns by the one combination of the plurality of filters; and an image receiver configured to detect and receive an image of an input means and a formed virtual optical input pattern.

16. The mobile device according to claim 14, wherein at least one of the patterns formed in the plurality of filters is a holographic pattern.

\* \* \* \* \*